INVENTORS.
DAVID J. SPANJER
BY ALLAN J. WILDEY

Tweedale & Gerhardt
ATTORNEYS.

3,521,713
VEHICLE WITH IMPROVED BLADE MOUNTING
ARRANGEMENT
David L. Spanjer, Willowdale, Ontario, and Allan J.
Wildey, Markham, Ontario, Canada, assignors, by
mesne assignments, to Massey-Ferguson Inc., Des
Moines, Iowa, a corporation of Maryland
Filed Aug. 27, 1968, Ser. No. 755,606
Int. Cl. A01b 15/14
U.S. Cl. 172—776
5 Claims

ABSTRACT OF THE DISCLOSURE

A log skidder is provided with a transversely disposed forward blade supported by a pair of rearwardly extending arms that are pivoted to the side walls of open ended hollow housings mounted on either side of the skidder frame. A hydraulic jack is mounted within each housing and is pivotally attached to each arm. A plate is mounted on each arm forwardly of the jack pivot so as to close the housing opening in the blade raised position to prevent any damage to the hydraulic jacks.

This invention relates generally to vehicles having material handling blades and more particularly to a vehicle with an improved blade arrangement.

Many log skidders and other type of heavy duty vehicles are provided with front mounted material handling blades for moving logs and light duty bulldozing work. The blade supporting arms are normally pivoted externally to either side of the frame and are powered by hydraulic jacks mounted externally on either side of the frame. This external hydraulic jack mounting exposes the jacks and the hydraulic hoses to damage from dense underbrush, tree stumps, rocks, etc.

It has been proposed to mount the hydraulic jacks within the vehicle frame or hull where they drivingly engage crank arms mounted on elongated pivot pins or rods which extend outwardly of the frame to a cantilever mounting of the blade arms. However, this arrangement necessitates placement of the jacks in a vertical plane substantially spaced from the arm planes. Thus, any substantial forces on the blade will tend to deform the elongated pivot pins by bending or twisting.

It is therefore an object of this invention to provide a blade mounting arrangement wherein the hydraulic jacks are located within a protective housing but which permits arrangement of the jacks and the arms in the same vertical plane to eliminate such bending or twisting deformation of the pivots.

In accordance with this invention, a vehicle is provided having a frame, a material handling blade, means pivotally mounting the blade on the frame for movement between raised and lowered positions, power operated means for raising and lowering the blades, a hollow housing mounted on the frame and having an opening, means mounting the power operated means within the housing for movement through the opening to raise and lower the blade, and means for closing the housing opening.

Further objects, features, and advantages of this invention will become more readily apparent upon reference of the following detailed description of a preferred embodiment, as shown in the accompanying drawings, in which.

Figure 1:
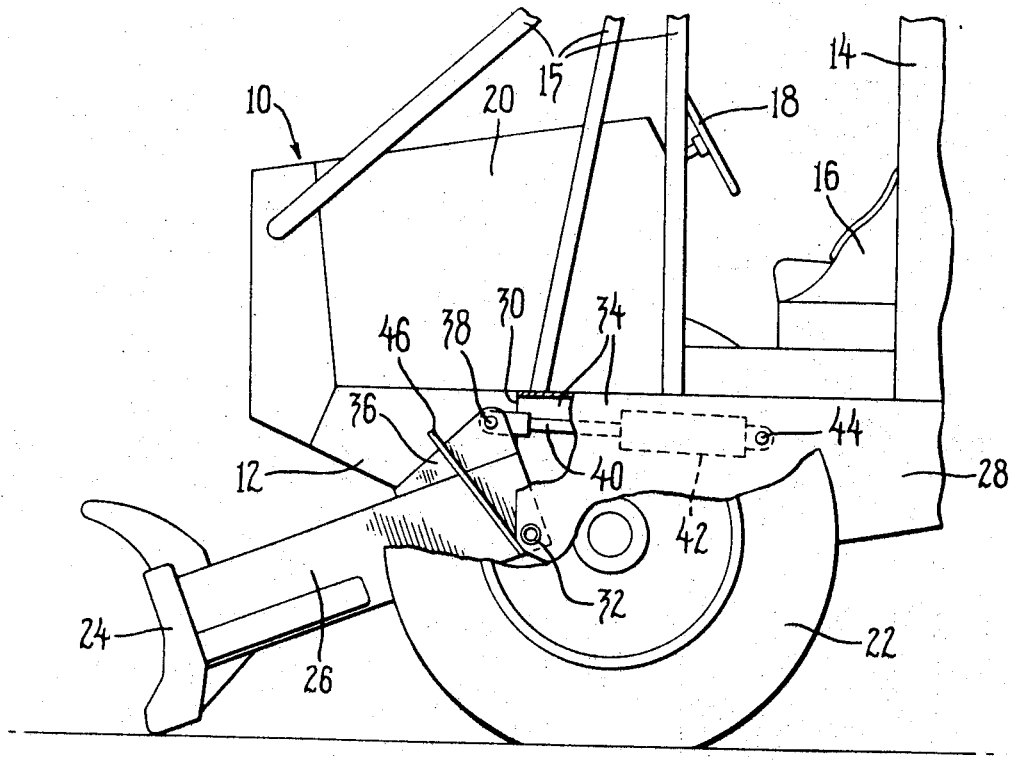
FIG. 1 is a side elevation of a portion of the front end of a log skidder embodying an improved blade mounting arrangement according to this invention, with the blade shown lowered to use position.
Figure 2:
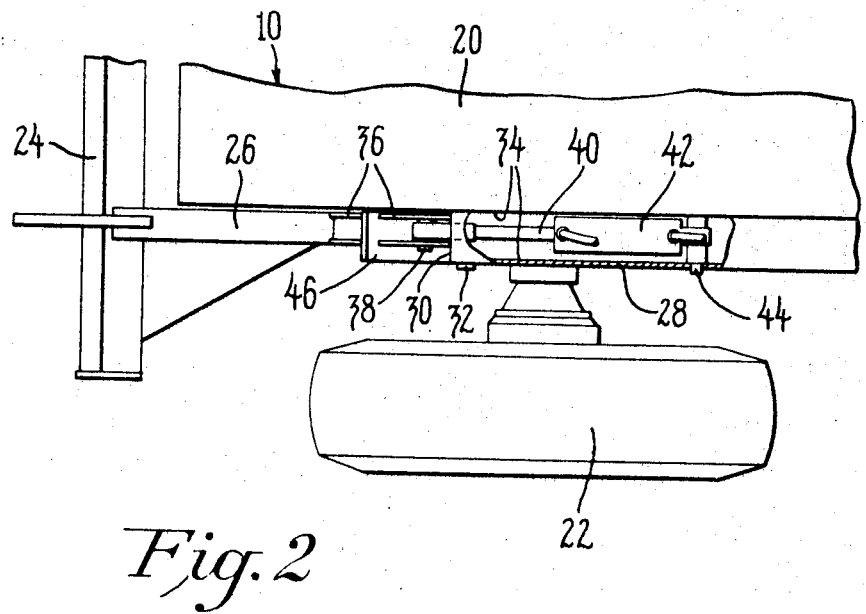
FIG. 2 is a fragmentary plan view of the skidder shown in FIG. 1, partially broken away to show the details of the blade mounting arrangement.

Referring now to FIGS. 1 and 2 of the drawings, the front portion of a log skidder 10 includes a frame 12 mounting an operator's cab 14 including support struts 15, which encloses a seat 16 and a steering wheel 18. The frame also mounts an engine (not shown) located beneath a hood 20 and a pair of drive wheels 22, only the left-hand of which is shown, conventionally powered by the engine.

The skidder 10 also includes a curved transversely extending material handling blade 24 that is supported on either side of the frame 12 by a pair of rearwardly extending pair of arms 26. The arms 26 and the means for mounting them are identical and therefore only the left-hand arm and mounting arrangement is shown and will now be described.

Figure 4:
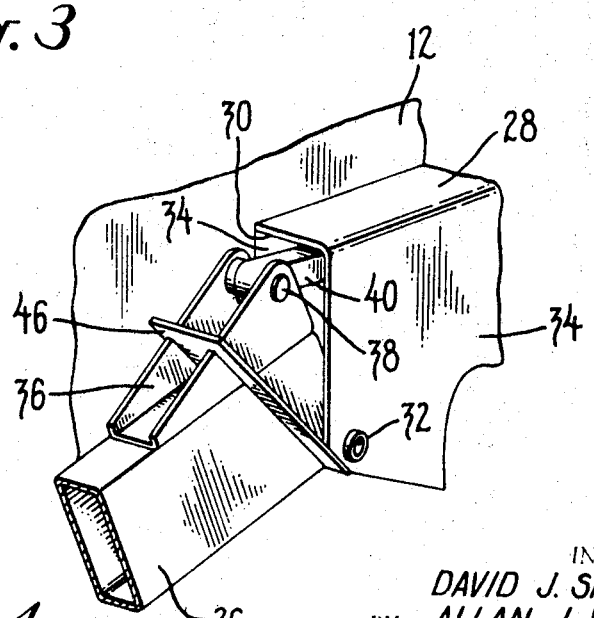
FIG. 4 is an enlarged perspective detail view of the improved blade mounting arrangement.

A hollow housing 28 is mounted on either side of the frame 12 and has a generally tapered rectangular cross section terminating in a generally rectangular opening 30 located at the front end. As best shown in FIGS. 2 and 4, the arms 26 are pivotally attached to a pivot pin at 32 extending between the side walls 34 of the housing 28. A triangular U-shaped bracket 36 is mounted on the top of the rear portion of arm 26 and includes a pivot pin to 38 which pivotally supports the front end of an extensible arm 40 of a power operator, preferably a double-acting hydraulic jack 42. The rear end of jack 42 is pivoted at 44 between the side walls 34 of housing 28 and the jack is supplied with pressure fluid from a conventional hydraulic pump (not shown) driven by the engine. The bracket 36 and the rear end of arm 26 additionally support a generally rectangular plate 46 which has approximately the same dimensions as opening 30.

Figure 3:
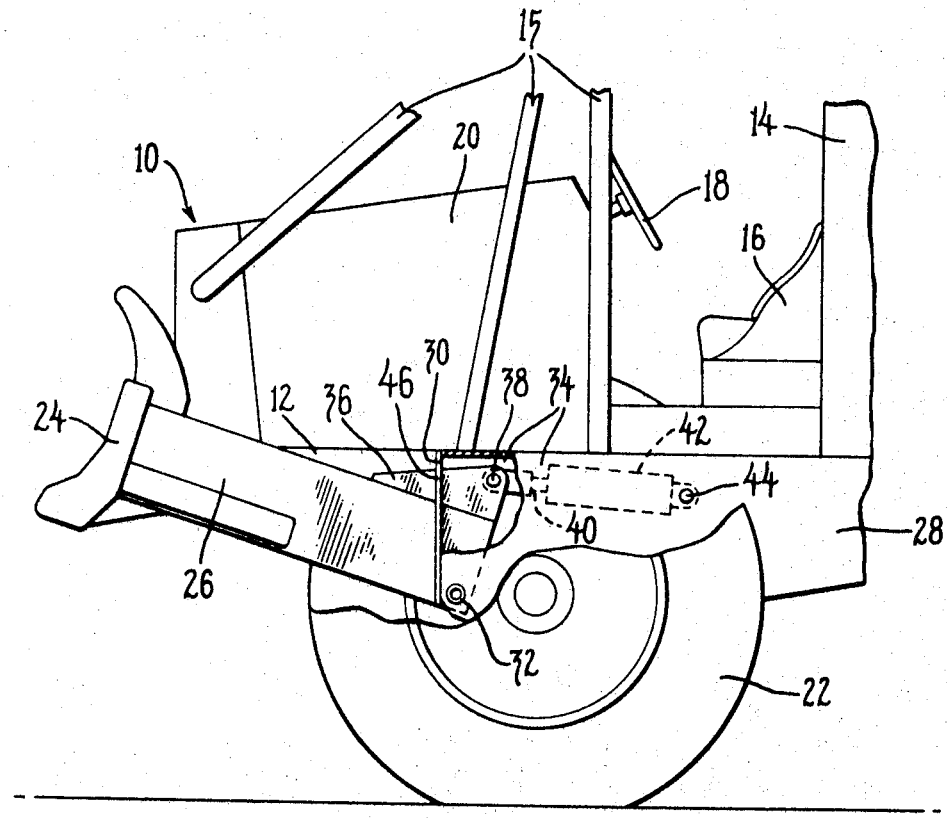
FIG. 3 is a view similar to FIG. 1, with the blade shown in raised position.

When it is desired to use blade 24 for moving logs or for light duty bulldozer work, the jacks 42 are charged so as to extend arms 40 and thus pivot arms 26 counterclockwise about pivots 32 thus lowering blade 24 to the use position, as shown in FIG. 1. When use of the blade is no longer desired, such as when the skidder is used for skidding logs, the jacks 42 are powered so as to pivot arms 26 clockwise until the blade assumes the raised position shown in FIG. 3. In the FIG. 3 position, the plates 46 completely close openings 30 to completely close the jacks 42 within the housings 28.

Thus, this arrangement prevents the entrance of any external objects from entering housing 28 and completely protects the jack 42 from any damage when the blade is in raised position. This is sufficient protection, because underbrush, logs, rocks and other obstructions are normally encountered only during skidding or transport, when the blade is not in use.

It will be noted with reference to FIG. 2 that this blade mounting arrangement enables placement of the pivots 32 and 38, arms 26, and jacks 42 in the same vertical plane. This prevents bending or twisting of the pivot pins and maximizes power output of the jacks 42 and enables more rugged use of the blade 42.

It is readily apparent that many modifications of this improved blade mounting arrangement could be made without departing from the scope of this invention. For example, a single blade support arm and single housing could be used, different closures could be substituted for the plates, the arrangement could be used on other types of vehicles, and the arrangement could be used for blades mounted other than forwardly of the vehicle.

We claim:
1. A log skidder comprising, in combination: a frame, a laterally extending blade located forwardly of the frame, a pair of laterally spaced longitudinally extending arms, means mounting the blade on the front ends of the arms, spaced enclosed housing portions on the frame each including a front opening, means pivoting the rear end of each arm to the frame within each housing portion, the arms extending through the openings, power operated means located within each housing portion for pivoting a portion of the arms through the openings to move the blade between raised and lowered positions, and closure plates mounted on the arms for closing the openings in blade raised position to provide a closed protective housing for the power operated means and prevent externally caused damage thereto.

2. A log skidder comprising, in combination: a frame, a forwardly disposed blade, spaced arms mounting the blade at the front ends thereof, pivot means pivoting the rear ends of the arms to the frame, a rigid hollow housing mounted on each side of the frame, each hollow housing having a front opening, power operated means including a hydraulic jack located within each housing, second pivot means pivoting one end of each jack to the frame within the housing, third pivot means pivoting the other end of each jack to the arm, the jacks being extensible and retractable to move a portion of the arms through the openings to move the blade between raised and lowered positions, and a plate mounted on each arm for engaging the periphery of the openings in the blade raised position to completely enclose the jack within the housings and prevent externally caused damage thereto.

3. The combination of claim 2, wherein: each hollow housing includes spaced side walls, the first pivot means extending between the side walls to pivot the rear ends of the arms to the frame within the housing, the third pivot means extending between the side walls at a point spaced rearwardly of the plates to completely close the jacks within the housing in blade raised position.

4. The combination of claim 1, 2, 3, or 5, wherein: each power operated means and its connected arm are mounted to lie in the same vertical plane.

5. In a vehicle having a frame, a material handling blade, and an arm mounting the blade on the frame for movement between raised and lowered positions, the combination comprising: a hollow enclosed housing mounted on the frame and having an opening, power operated means mounted within the housing, connecting means interconnecting the arm and the power operated means through the opening and moving through the opening upon operation of the power operated means to raise and lower the blade, and closure means mounted on the connecting means for completely closing the opening in the blade raised position to provide a closed protective housing for the power operated means and prevent externally caused damage thereto.

References Cited

UNITED STATES PATENTS 2,269,775   1/1942   Le Bleu _____ 172—809

ROBERT E. PULFREY, Primary Examiner

J. W. PETERSON, Assistant Examiner

U.S. Cl. X.R.

37—117.5; 172—491, 809; 280—481